United States Patent
Fowler

[11] 3,946,875
[45] Mar. 30, 1976

[54] FIELD OPERATED CANE CLEANING APPARATUS

[75] Inventor: Larry G. Fowler, Belle Glade, Fla.

[73] Assignee: Sugar Cane Growers Cooperative of Florida, Belle Glade, Fla.

[22] Filed: Aug. 26, 1974

[21] Appl. No.: 500,654

[52] U.S. Cl. .................. 209/115; 209/134; 56/12.8
[51] Int. Cl.[2] ........................................ B07B 13/10
[58] Field of Search ............ 209/95, 115, 134, 135, 209/136, 137, 152, 295; 56/12.8, 13.3

[56] References Cited
UNITED STATES PATENTS

| | | | |
|---|---|---|---|
| 3,259,241 | 7/1966 | Hughes | 209/95 X |
| 3,307,338 | 3/1967 | Mizzi | 56/13.3 |
| 3,599,404 | 8/1971 | Fernandez et al. | 56/12.8 |
| 3,608,597 | 9/1971 | Hill | 56/12.8 |
| 3,612,273 | 10/1971 | Pritchett | 209/95 |
| 3,612,275 | 10/1971 | Tiepel | 209/152 |
| 3,788,048 | 1/1974 | Stiff et al. | 56/12.8 |
| 3,828,536 | 8/1974 | Fowler | 56/13.3 |
| 3,863,431 | 2/1975 | Fowler | 56/12.8 |

Primary Examiner—Allen N. Knowles
Attorney, Agent, or Firm—Mason, Fenwick & Lawrence

[57] ABSTRACT

A vehicle mounted cane cleaning apparatus is disclosed including a large drum having inwardly facing conveyor pockets mounted for rotation about a horizontal front-to-rear axis on a tracked vehicle; cane segments are hurled from a conventional segmentizer into a lower portion of the drum against a shroud plate and rotating perforated cylinder across which a trash removing airflow is provided by blower means. Rotation of the drum carries the can upwardly to a location at which it falls downwardly in a cascade of segments across which a fan driven airflow extends for removing remaining additional trash particles with the cleaned cane segments falling on conveyor means carrying the segments rearwardly and then transversely to a receiving vehicle. A lower shroud and fan arrangement providing the airflow across the lower portion of the drum includes a mechanical conveyor receiving heavier trash particles from the rotating perforated cylinder for conveying such heavier particles rearwardly for discharge from the vehicle.

9 Claims, 3 Drawing Figures

FIELD OPERATED CANE CLEANING APPARATUS

This invention is in the field of agricultural equipment and is specifically directed to sugar cane harvesting machinery capable of severing standing cane in the field, or of lifting previously severed windrowed cane from the field, segmentizing the cane in short segments by the operation of cutting means and thoroughly cleaning the cane to remove trash and other particles.

There have been substantial advances in the art of cane harvesting in recent years with emphasis being placed upon automation of the cutting, segmentizing and cleaning of the cane in order to reduce the labor cost involved in the harvesting and refining processes. Presently known harvesting devices are of two general types in that they are for harvesting standing cane or for harvesting previously cut windrowed cane. In both types of harvesting machines, the cane is conveyed through segmentizing means generally comprising rotating blade members capable of chopping the cane into small cane segments for subsequent discharge into an accompanying trailer, truck or other vehicle for removing the cane segments from the field. A primary problem encountered with both the windrow type harvesters and the standing cane harvesters substantial that both types of harvesters pick up a substantialy amount of trash along with the cane leaves and cane members. It is desirable that all of the leaves, trash and similar material be separated from the cane segments and returned to the field rather than conveyed to the refinery. While prior known devices such as those exemplified by U.S. Pat. Nos. 2,246,352 to Falkiner, 3,325,982 to Fogels et al. 3,599,404 to Fernandez and 3,788,048 to Stiff et al, have provided various mechanisms in an effort to eliminate the trash and leaf particles, such devices have not been totally effective and the problem of trash and leaf removal from the cane segments has remained an inadequately solved problem up until the present invention.

Therefore, it is the primary object of this invention to provide a new and improved cane cleaning and loading apparatus.

Another object of the invention is the provision of a new and improved cane cleaning and loading apparatus for cleaning cane segments in a standing cane harvesting machine.

Yet another object of the present invention is the provision of a new and improved cane cleaning and loading apparatus in conjunction with a windrowed cane harvesting machine.

Achievement of the objects of this invention is obtained by the preferred embodiment of the invention through the provision of a motor driven tracked vehicle having a vehicle frame having a conventional standing cane harvesting and cutting apparatus extending forwardly in a cantilever manner for severing the cane at or near ground level. The cane is conveyed rearwardly to a conventional segmentizing means provided for receiving the cane, chopping the cane into small segments and hurling the segments rearwardly for further handling. The foregoing structure is completely conventional; however, unique cleaning and handling means is provided to receive the cane segments which are hurled rearwardly from the segmentizing means. This structure more specifically includes a relatively large open ended cleaner drum mounted for rotation about a horizontal axis extending parallel to the axis of the vehicle immediately to the rear of the segmentizer means. Deflector means is provided on the vehicle frame extending internally of the drum so that cane segments and accompanying trash and leaf particles hurled from the segmentizer strike the deflector and are deflected downwardly into the lower portion of the rotary cleaner drum. The deflector means includes a metal deflector shroud plate extending internally of the drum across a portion of the width of the drum in a generally horizontal manner near the axis of the drum and a rotary perforated cylinder means mounted adjacent the rear side of the drum for motor driven rotation about an axis transverse to the axis of the vehicle and the axis of the drum with the perforated cylinder means being positioned immediately adjaent the rearmost portions of the portions of the deflector shroud inside the drum with a small clearance being provided between the deflector shroud plate and the surface of the perforated cylinder. A motor driven blower is positioned at the rear end of a trash removing hood having its forward end enclosing the perforated cylinder and extending rearwardly from the deflector shroud plate. Operation of the last-mentioned blower creates a trash removing draft of air through the trash removing hood, the perforated cylinder and through portions of the cleaner drum immediately upstream of the perforated cylinder through which the cane segments are being hurled by the operation of the segmentizer means. The trash removing air draft causes leaf and other trash particles accompanying the cane segments from the segmentizer to be carried against the surface of the perforated cylinder facing the air draft to adhere to the cylinder so that subsequent rotation of the perforated cylinder moves the trash particles to a position in which the air draft removes the particles from the cylinder and discharges same upwardly through the blower means. Additionally, a mechanical conveyor is provided beneath the perforated cylinder and extending rearwardly within the trash removing hood for receiving the heavier particles and conveying them mechanically toward the rear of the machine from which they are discharged.

The cleaner drum includes inwardly facing open pockets about its periphery and is driven by hydraulic or other conventional motor means so that rotation of the drum lifts the cane segments upwardly to upper portions of the drum from which the segments fall in a substantially continuous cascade. The cascade of falling cane segments is contained within the interior of the cleaner drum and a second stage trash removal blower means is provided immediately to the rear of the uppermost portions of the drum in which the cascade occurs for creating an airflow through the falling cane segments to remove leaf or other trash particles remaining with the cane members. A cane removal conveyor means extending from front to rear has its infeed end positioned internally of the cleaner drum in the cane segment cascade for receiving the cane segments and conveying same rearwardly onto a transversely extending discharge conveyor extending outwardly of the vehicle for feeding the cane segments to an accompanying truck or other vehicle.

A better understanding of the preferred embodiment of the invention will be achieved when the following written description is considered in conjunction with the appended drawings in which.

Figure 2:
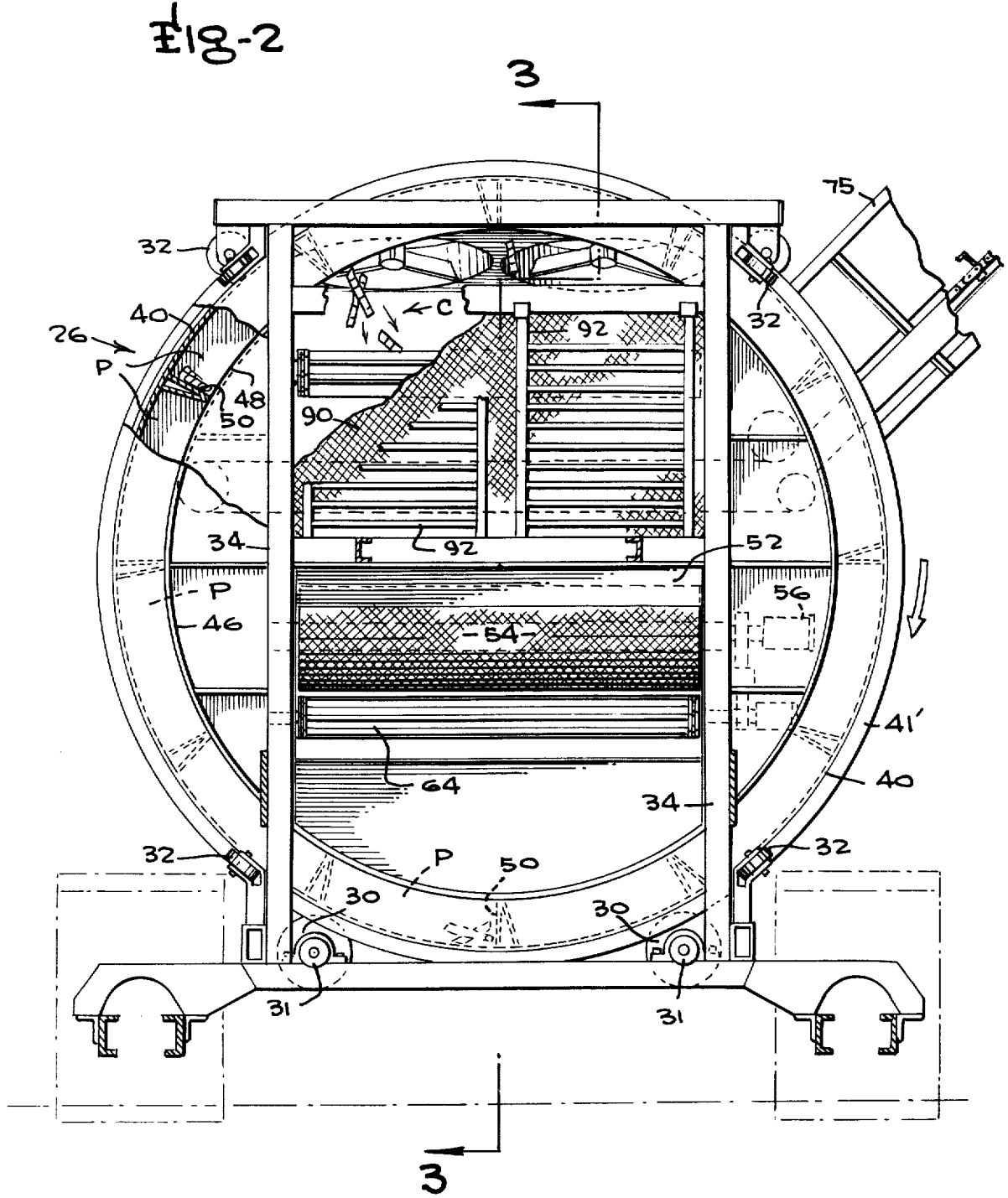
FIG. 2 is a sectional view taken along lines 2—2 of FIG. 1.

Attention is initially invited to FIG. 2 of the drawings which comprises a side elevation view of a tracked field-operated cane harvester vehicle generally designated 10 in which the preferred embodiment of the invention is provided. The vehicle frame provides support for a forwardly extending conventional standing cane harvester unit 20 for severing the standing cane and conveying same rearwardly to a segmentizer in which the cane is received between the nip of rotary cutting members mounted on cutter shafts 22 and 24 which cut the cane into short segments S which are hurled rearwardly from the segmentizer means into a large rotary cleaner drum 26. The standing cane harvester unit and the segmentizer means form no part of the invention and any conventional unit capable of providing these functions can be employed. For example, the harvester means and the chopper means of the previously mentioned Fogels et al. Fernandez and Stiff et al. patents could be employed for cutting and segmentizing the cane members. Additionally, the segmentizer means can be of other conventional construction such as that illustrated in Pool et al. U.S. Pat. No. 3,723,669 or my prior co-pending application Ser. No. 358,695.

Moreover, the harvester unit can also be of the windrowed cane harvesting type such as that disclosed in my co-pending application Ser. No. 358,695 in which previously cut windrowed cane is lifted from the field and segmentized.

Figure 3:
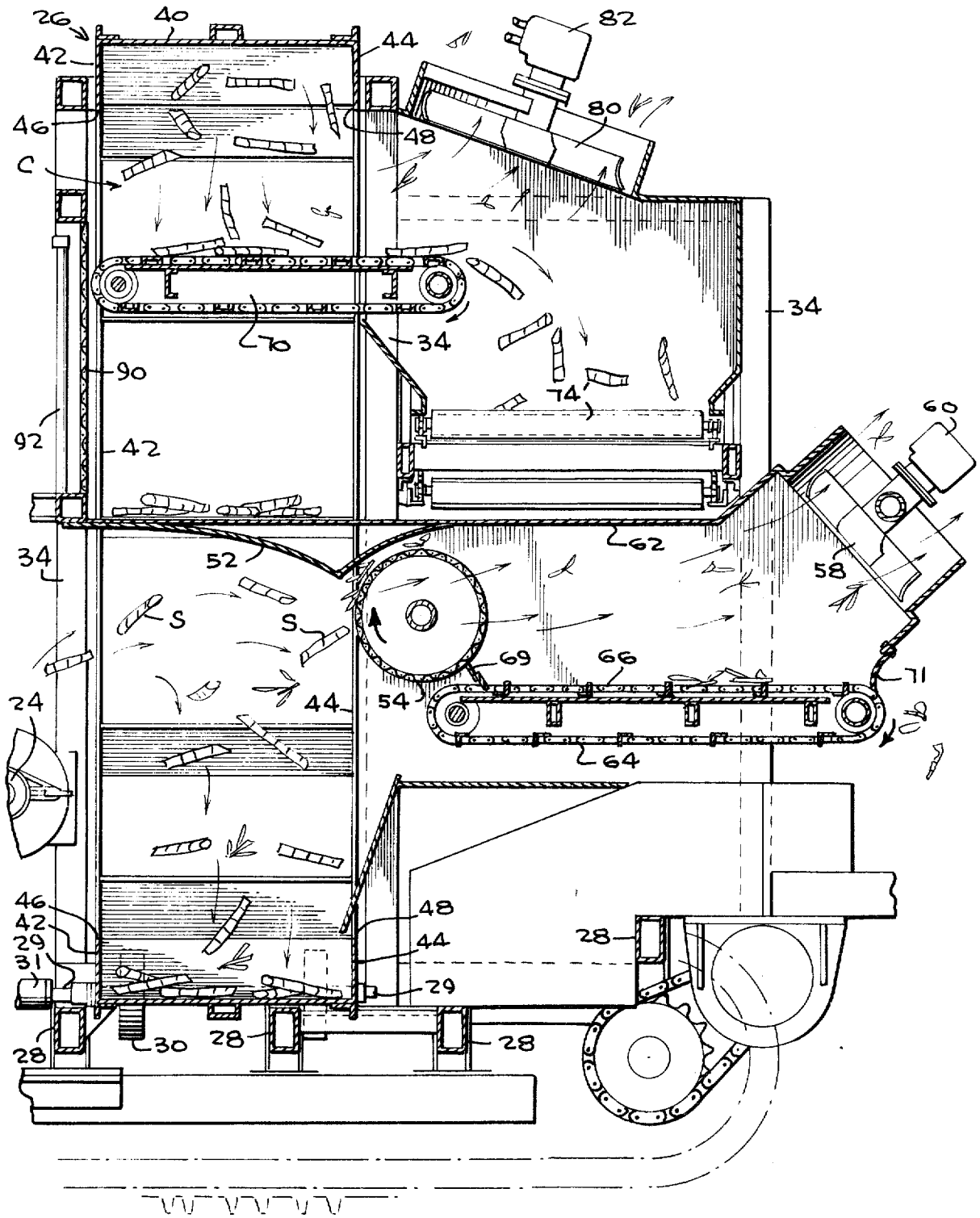
FIG. 3 is a sectional view taken along lines 3—3 of FIG. 2.

The vehicle frame includes a plurality of transverse box frame members 28 illustrated in FIGS. 2 and 3 which provide support for a drum support shaft 29 on which drum support rollers 30 are mounted for supporting the drum member 26 for rotation about a horizontal axis extending from front to rear of the vehicle. Hydraulic motors 31 are connected to each of the shafts supporting the rollers 30 for providing driven rotation of the rollers in the direction of the arrows in FIG. 2 which provide resultant rotation of drum 26 as also indicated by the arrows in FIG. 2. Idler rollers 32 and 32' maintain the drum in position for easy rotation in conjunction with the driven rollers 30 in an obvious manner.

The transverse frame members 28 also provide support for vertical standards 34 which support various other components such as the driver's station 36 and the conveyor and blower means to be discussed hereinafter.

Drum 26 includes an outer coaxial cylindrical wall 40 connected at its front and rear edges to a front wall 42 reinforced by a peripheral rib 41 and side flanges 41' which are engaged by rollers 32. The front wall 42 is oriented in a plane perpendicular to the axis of rotation of the drum which is coextensive with the axis of the cylindrical wall 40. A rear wall 44 is oriented in a plane parallel to the plane of front wall 42 as shown in FIG. 3. Front and rear walls extend inwardly from the cylindrical wall 40 to a circular edge termination respectively at 46 and 48 so that the drum 26 is open on its front and rear faces. A plurality of equidistantly spaced lift plates 50 extend inwardly from the cylindrical wall portion 40 between the front and rear walls 42 and 44 to which they are fixedly attached by welding or other suitable means to define a plurality of inwardly facing pockets P which receive the cane segments S in a manner and for a purpose to be discussed hereinafter.

Cane segment deflector means is mounted on the frame to extend internally of the drum 26 and includes a metal deflector shroud plate 52 illustrated in FIG. 3 and a rotary perforated cylinder 54 formed of screen or the like and motor driven by a hydraulic motor 56 (FIG. 2) to rotate in the direction of the arrows in FIG. 3. The rotary perforated cylinder 54 contains substantially large openings that are of sufficient size to permit the flow of air through the cylinder as shown by the arrows in FIG. 3 with the airflow being effected by means of a blower fan 58 driven by motor means 60. A trash removing hood 62 encloses the fan 58 and extends forwardly for juncture with the deflector shroud plate 52 at the rear edge termination of the shroud plate 52.

Figure 1:
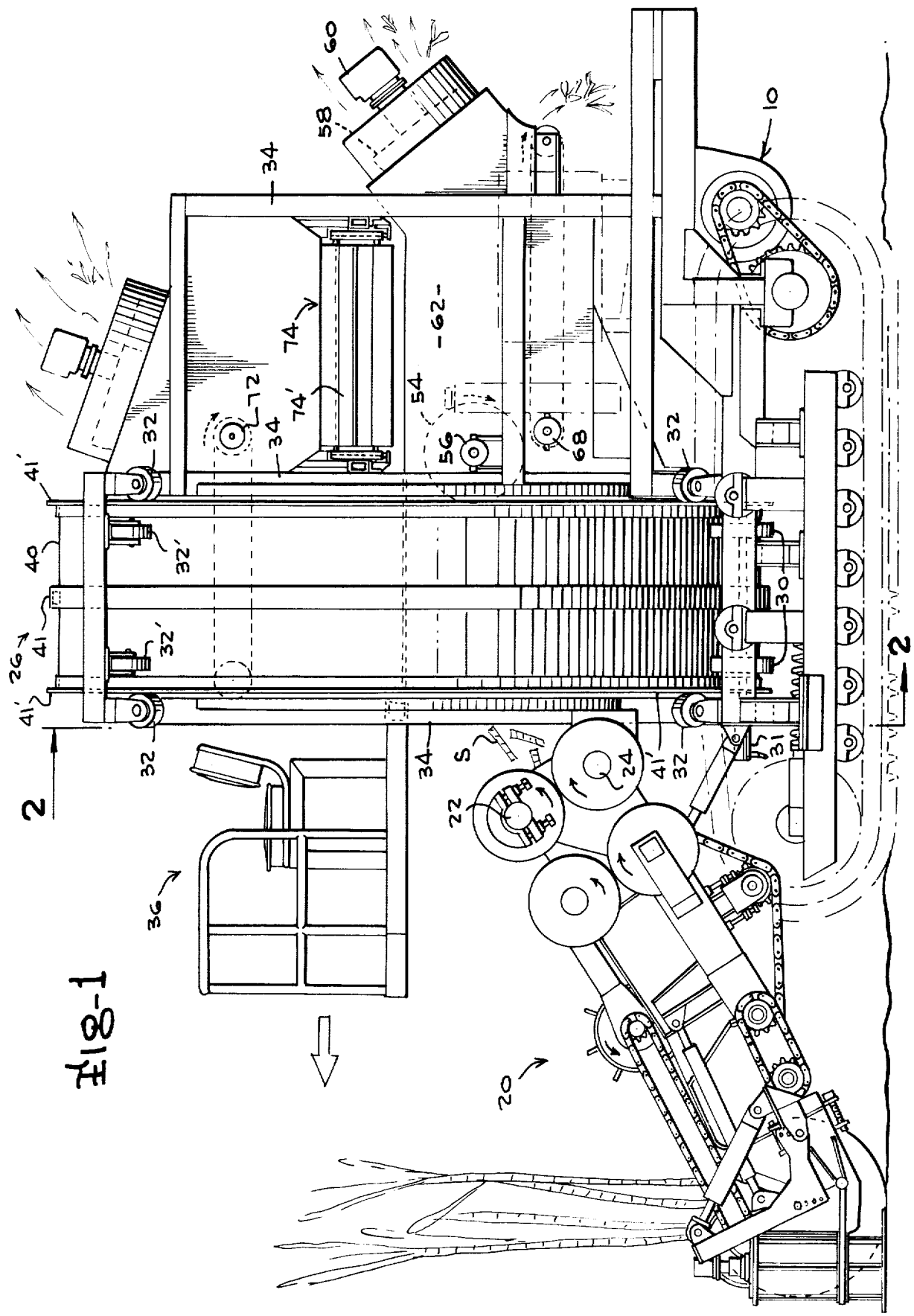
FIG. 1 is a side elevation view of the preferred embodiment of the invention.

It should be noted that the upper surface of the perforated cylinder 54 is spaced from the hood 62 and the deflector side plate 52 by an amount adequate to permit trash particles engaging the surface of the cylinder 54 and held thereon by the airflow to be carried around with the cylinder as it rotates to be subsequently discharged from the face of the cylinder by the airflow in an obvious manner. Additionally, a mechanical trash removing conveyor 64 is provided in the bottom of the trash removing hood 62 for receiving the heavier trash particles 66 to convey same to the rear portion of the machine from which the heavier trash is discharged as shown in FIG. 3. Trash removing conveyor 64 is driven by a hydraulic motor 68 illustrated in FIG. 1 and seal means 69 and 71 at opposite ends of the conveyor prevent air leakage through the conveyor area so as to concentrate airflow through the area of perforated cylinder 54 as shown in FIG. 3.

Cane segments S hurled from the segmentizer means strike the deflector shroud plate 52 and/or the perforated cylinder 54 to be deflected downwardly into the pockets P in the lower portion of the drum 26 as shown in FIG. 3. The force with which the cane segments strike the shroud and the perforated cylinder serves to dislodge adhering trash and leaf particles on the cane segments which trash and leaf particles are removed along with other similar particles by the airflow through the drum created by fan means 58.

Rotation of the drum 26 lifts the cane segments in the pockets P upwardly to the upper portions of the drum from which the cane segments fall in a relatively continuous cascade C downwardly onto a cane drum removal conveyor 70 mounted on the frame and positioned in a front to rear orientation as shown in FIG. 3. Cane drum removal conveyor 70 is driven by a hydraulic motor 72 (FIG.1) in the direction of the arrows in FIG. 3 so that the cane segments falling on the conveyor are removed rearwardly to fall downwardly onto a transversely extending discharge conveyor 74 which includes a horizontal portion 74' and an upwardly inclined portion 75 (FIG. 2) both of which are driven by hydraulic motor means in a conventional manner. The outer end of the upwardly inclined portion 75 is positioned to discharge the cane segments into an accompanying truck or the like.

The cascade C of cane segments is subjected to an airflow created by a second fan 80 driven by hydraulic motor 82 and mounted in a shroud for providing airflow as shown in FIG. 3. Additionally, the airflow created by the fan 80 extends across the cane removal conveyor 70 and the discharge conveyor 74 for removing any remaining additional trash or leaf particles from the cane. The continuous cascade of cane onto the conveyor 70 and the falling of the cane from the end of conveyor 70 onto horizontal portions 74' of the discharge conveyor provides additional mechanical agitation of the cane serving to dislodge trash particles adhering thereto.

A front screen 90 is provided in front of the drum 26 forwardly of the conveyor 70 for preventing the segments from falling forwardly out of the confines of drum 26 while permitting the airflow through the screen for trash removal purposes. Screen 90 is positioned adjacent a hydraulic oil cooler 92 positioned forwardly of the screen member as shown in FIG. 2.

Therefore, it will be appreciated that the preferred embodiment provides a substantial amount of mechanical agitation of the cane segments which are also subjected to substantial quantities of high speed airflow while airborne at least three different locations in the system so as to achieve an effective removal of substantially all of the trash and leaf particles accompanying the cane segments. While numerous modifications of the preferred embodiment will undoubtedly occur to those of skill in the art, it should be understood that the spirit and scope of the invention is to be limited solely by the appended claims.

I claim:

1. A vehicle mounted cane loader-cleaner device for receiving relatively short cane segments hurled from a cane chopping segmentizer means, removing trash from the cane segments and conveying the clean cane segments to a discharge conveyor for deposit into an accompanying receiving trailer vehicle or the like, said loader-cleaner including frame means supporting rotary drum support means, segmentizer means from which plural cane segments are ejected in a rearward line of flight with respect to said vehicle, an open-ended cleaner drum mounted for rotation about a horizontal axis on said rotary drum support means and positioned rearwardly of and adjacent said segmentizer to receive cane segments from said segmentizer, said cleaner drum including inwardly facing pockets defined by an outer cylindrical wall, first and second radially extending end walls joined to said outer cylindrical wall along opposite edge portions thereof and equidistantly spaced lift plates extending inwardly from said outer cylindrical wall between and perpendicular to said end walls so that the space between adjacent lift plates, portions of the end walls and the outer cylindrical wall between said adjacent lift plates defines individual ones of said inwardly facing pockets, means for drivingly rotating said cleaner drum about a horizontal axis so that said inwardly facing pockets move in a circular path, deflector means positioned internally of said rotary cleaner drum in the line of flight of said cane segments for deflecting cane segments hurled from said segmentizer into the pockets of said drum in the lower portion of said drum so that continued rotation of said drum lifts the cane segments upwardly to upper portions of the drum from which the segments fall to provide a cascade of cane, second stage trash removal blower means for creating an upper front to rear airflow through said drum across said falling cascade of cane segments above said deflector means for removing trash particles from said cane segments, a cane removal conveyor extending into said cascade of falling cane segments for receiving said cane segments and conveying said cane segments rearwardly outwardly of said rotary cleaner drum, discharge conveyor means receiving said cane segments from said cane removing conveyor for conveying said cane segments to a receiving trailer, vehicle or the like and infeed trash removal blower means for creating a lower front to rear airflow through said drum across the line of flight of infeed cane hurled from said segmentizer.

2. The invention of claim 1 wherein said deflector means includes a front to rear extending metal shroud plate extending internally of said drum across the width of said drum in a generally horizontal direction and a rotary perforated cylinder means mounted closely adjacent rear portions of said shroud plate on the rear side of said cleaner drum opposite the side from which said cane segments are hurled, said infeed blower means including trash removing hood means enclosing said perforated cylinder and motor driven fan means for pulling air through said drum and subsequently through said perforated cylinder transversely with respect to the axis of said perforated cylinder so that said airflow causes trash particles to engage the side of said perforated cylinder facing said drum, means for drivingly rotating said perforated cylinder whereby trash particles engaging said cylinder are carried by said cylinder to a position in which said infeed air blast operates to remove said trash particles rearwardly of said vehicle.

3. The invention of claim 2 additionally including mechanical conveyor means extending along the bottom portion of said trash removing hood for receiving heavier trash particles and conveying same rearwardly for discharge from said vehicle.

4. The invention of claim 3 wherein said cane removing conveyor extends transversely of said conveyor and said second stage trash removal blower means is mounted above said cane removing conveyor adjacent the rear side of said drum.

5. A vehicle mounted cane loader-cleaner device for receiving relatively short cane segments hurled from a cane chopping segmentizer means, removing trash from the cane segments and conveying the clean cane segments to a discharge conveyor for deposit into an accompanying receiving trailer vehicle or the like, said loader-cleaner including first blower means creating a trash removing airflow across an area adjacent the segmentizer means through which area cane segments are ejected by the segmentizer means, lifting means for receiving cane segments from said segmentizer and conveying said cane segments to an elevated position to provide a cascade of falling cane segments, second trash removal blower means for creating an airflow through said falling cascade of cane segments for removing trash particles from said cane segments, a cane removal conveyor extending into said cascade of falling cane segments for receiving said cane segments and conveying said cane segments rearwardly outwardly of said cascade of falling cane segments and discharging said cane segments in a second cascade across which a portion of the airflow created by said second blower extends to remove trash particles in said second cascade, discharge conveyor means extending in said second cascade for receiving said cane segments from said cane removing conveyor for conveying said cane segments to a receiving vehicle.

6. The invention of claim 5 wherein said lifting means for receiving said cane segments from said segmentizer means comprises a driven rotary drum conveyor mounted adjacent said segmentizer.

7. The invention of claim 6 additionally including a rotary perforated cylinder means mounted adjacent the side of said rotary drum opposite said segmentizer means, said first blower means including trash removing hood means enclosing said perforated cylinder and motor driven fan means for pulling air through said drum and subsequently through said perforated cylinder transversely with respect to the axis of said perforated cylinder so that said airflow causes trash particles to engage the side of said perforated cylinder facing said drum, means for drivingly rotating said perforated cylinder whereby trash particles engaging said cylinder are carried by said cylinder to a position in which said infeed air blast operates to remove said trash particles from said perforated cylinder to discharge said trash particles from said vehicle.

8. The invention of claim 7 additionally including mechanical conveyor means extending along the bottom portion of said trash removing draft hood for receiving heavier trash particles incapable of being discharged by the airflow in said hood and conveying said heavier particles rearwardly for discharge from said vehicle.

9. The loader-cleaner device of claim 8 wherein said cane removing conveyor extends transversely of said vehicle and said second trash removal blower means is mounted above said cane removing conveyor adjacent the rear side of said rotary drum conveyor.

* * * * *